May 25, 1948.　　　　W. R. PRICE　　　　2,442,313

SPIRAL WOUND GASKET

Filed Dec. 10, 1946

INVENTOR
William R. Price
BY
*N. L. Leek*
ATTORNEY

Patented May 25, 1948

2,442,313

UNITED STATES PATENT OFFICE 2,442,313

SPIRAL WOUND GASKET

William R. Price, Wayne, Pa., assignor to Flexitallic Gasket Company, Camden, N. J., a corporation of New Jersey Application December 10, 1946, Serial No. 715,314

2 Claims. (Cl. 288—27)

This invention relates to spiral wound gaskets composed of a longitudinally grooved metal strip spirally wound with a strip of compressible filler material such as asbestos, asbestos composition, a plastic composition, or a soft metal interposed between the metal convolutions and more particularly to a self-centering spiral wound gasket of the type shown in the Bohmer et al. Patent No. 2,027,299, dated January 7, 1936.

An object of the invention is to provide a spiral wound gasket of the above type having novel and improved centering and compression gauge means.

Another object is to provide a self-centering spiral wound gasket with a novel and improved gauge means to limit the compression to which the gasket is subjected.

Another object is to provide a gasket of the above type having novel and improved details of construction and features of operation.

Various other objects and advantages will be apparent as the nature of the invention is more fully disclosed.

Although the novel features which are characteristic of this invention are pointed out more particularly in the claims, the nature of the invention will be better understood by referring to the following description taken in connection with the accompanying drawing in which a certain specific embodiment thereof has been set forth for purposes of illustration.

In the following description certain specific terms are used for convenience in referring to various details of the invention. It is to be understood, however, that these terms are used only for purposes of illustration.

Figure 1:
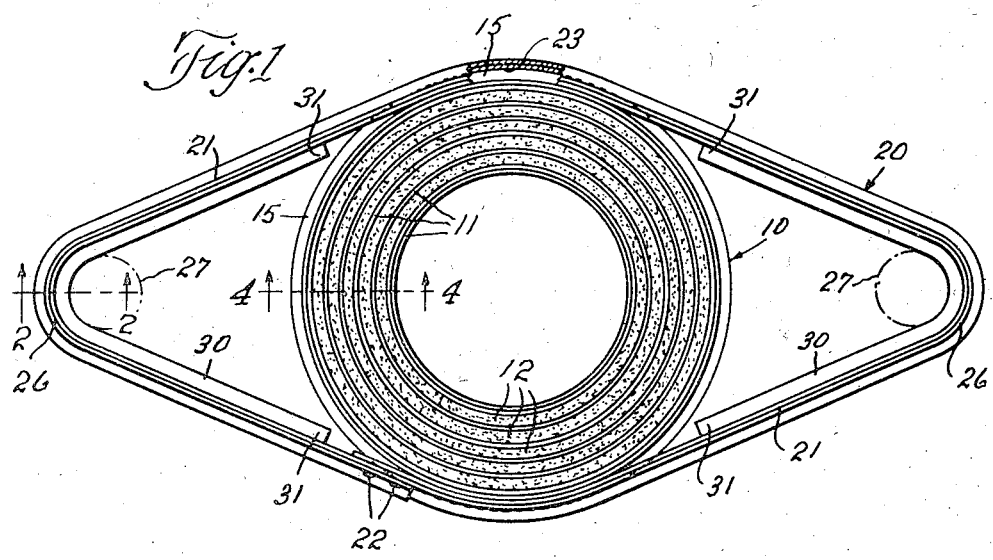
Fig. 1 is a plan view of a gasket embodying the present invention.

Referring to the drawings more in detail, a spiral wound gasket 10 is shown as comprising a metal strip 11 which is spiral wound with a strip 12 of compressible filler material, such as asbestos, asbestos composition, plastic composition, or a soft metal, interposed between successive convolutions of the metal strip. Fig. 1 is intended to indicate diagrammatically the spiral wound strips 11 and 12. It is to be understood that the relative thicknesses have been exaggerated for clarity. In the embodiment shown a plurality of metal-to-metal convolutions are provided at both the inner and outer peripheries of the gasket. Similar metal-to-metal convolutions may be provided at intermediate points if desired for strengthening purposes. The inner and outer ends of the spiral strip 11 are secured by welding to the adjacent metal convolutions.

Figure 4:
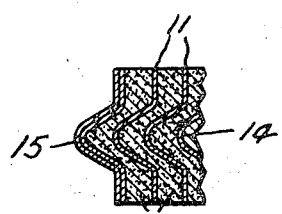
Fig. 4 is a partial section taken on the line 4—4 of Fig. 1.

The strip 11, as shown more in detail in Fig. 4, is formed with a longitudinally extending groove 14 and a corresponding longitudinal bead 15. The gasket is so wound that the bead 15 extends externally around its outer periphery.

In order to automatically center the gasket within the bolt circle of the flange to which the gasket is applied, a centering band 20 is provided. This band comprises one or more turns of a metal strip 21 similar to the strip 11 from which the gasket 10 is formed with the ends of the strip secured by welds 22 to the adjacent metal convolutions. The strip 21 is formed with a longitudinal groove 23 and bead 24 and with upstanding flanges 25. The band 20 is generally elliptical in shape having a portion engaging the outside of the gasket and with extended end portions forming loops 26 beyond the periphery of the gasket, which are adapted to pass around flange bolts 27 for centering the gasket. The outer peripheral bead 15 of the gasket 10 is secured within the groove 23 of the centering band 20 for securely holding the gasket in position and may be welded or held by the resilience of the band 20.

In order to impart greater rigidity to the centering band and also for the purpose of controlling the compression of the gasket, a gage wire 30 is snapped into the internal groove 23 of the loops 26 in a position to extend around the bolts 27 and with its ends 31 terminating short of the outer periphery of the gasket 10. The wire 30 may be secured in the centering ring by welding if desired, although in most instances the wire 30 may be formed of a spring material such as spring steel and may be arranged to be snapped into position and to remain therein due to its resilience.

Gaskets of this type are designed to compress laterally in response to the compressive force exerted by the opposed flanges and are constructed to exert the required sealing pressure when compressed a predetermined amount. The wire 30 constitutes a gage for determining the amount of deformation of the gasket.

Figures 2, 3:
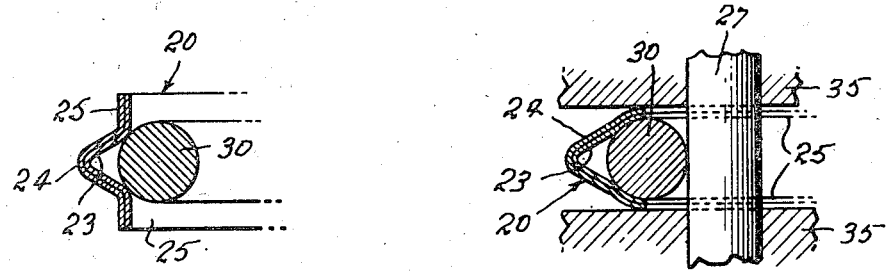
Fig. 2 is a transverse section through the centering and gage ring, taken on the line 2—2 of Fig. 1.
Fig. 3 is a section similar to Fig. 2 showing the centering ring compressed by the flanges between which the gasket is inserted.

In use the gaskets are placed between the flanges to be sealed, such for example as the end flanges of adjacent pipe lengths which are indicated as flanges 35 in Fig. 3. The loops 26 of the centering band 20 are passed around diametrically opposite bolts 27 in the bolt circle of the flanges 35 and the bolts are tightened to draw the flanges together. This causes the upstanding flanges 25 of the band 20 to fold over the wire 30 as shown in Fig. 3 so that the total metal thickness includes the diameter of the wire 30 and the thickness of the folded over flanges 25. The wire 30 is so designed that this combined thickness corresponds to the thickness to which the gasket is to be compressed.

In installing this gasket, the gasket is placed between the flanges 35 with the loops 26 extending around diametrically opposite flange bolts 27. The flanges 35 are then drawn together by tightening the flange bolts 27 until the flanges 25 are bent over the wire 30 as indicated in Fig. 3 and become solid with the wire to form a stop which limits the further deformation of the gasket. The gasket is so designed that when this point is reached the required sealing pressure is applied by bolts 27.

Although a specific embodiment of the invention has been shown for purposes of illustration, it is to be understood that the invention is capable of various uses and that changes and modifications may be made therein as will be apparent to a person skilled in the art. The invention is only to be restricted in accordance with the scope of the following claims.

What is claimed is:

1. In combination, a gasket comprising a spiral wound metal strip with a filler of compressible material between at least some of the metal convolutions, said metal strip being longitudinally grooved to form an outer peripheral bead extending around the gasket, a centering band composed of a longitudinally grooved metal strip extending around said gasket and secured thereto and having loops extending beyond the periphery of said gasket to encircle securing bolts, the longitudinal groove of said centering band being disposed over the outer peripheral bead of said gasket, and a metal gage wire disposed in the longitudinal groove of each of said loops to stiffen said loops, the diameter of said wire having a predetermined relationship to the thickness to which the gasket is to be compressed.

2. In combination, a gasket comprising a spiral wound metal strip with a filler of compressible material between at least some of the metal convolutions, said metal strip being longitudinally grooved to form an outer peripheral bead extending around the gasket, a centering band composed of a longitudinally grooved metal strip extending around said gasket and secured thereto and having loops extending beyond the periphery of said gasket to encircle securing bolts, the longitudinal groove of said centering band being disposed over the outer peripheral bead of said gasket, and a metal gage wire disposed in the longitudinal groove of each of said loops to stiffen said loops, the metal strip of said loops being adapted to be bent over said wire by the pressure of the opposed sealed surfaces, said wire and said bent over portions together being of a thickness corresponding to the thickness to which said gasket is to be compressed.

WILLIAM R. PRICE.

REFERENCES CITED

The following references are of record in the file of this patent:

UNITED STATES PATENTS

| Number | Name | Date |
| --- | --- | --- |
| 1,942,703 | Hubbard et al. | Jan. 9, 1934 |
| 2,027,299 | Bohmer et al. | Jan. 7, 1936 |
| 2,339,478 | Hoheisel | Jan. 18, 1944 |